United States Patent
Cavallo et al.

(10) Patent No.: US 7,257,651 B2
(45) Date of Patent: *Aug. 14, 2007

(54) SEQUENTIAL DATA TRANSFER DETECTION USING ADDRESSES OF DATA TRANSFER REQUESTS TO CONTROL THE EFFICIENCY OF PROCESSING THE DATA TRANSFER REQUESTS

(75) Inventors: Joseph S. Cavallo, Framingham, MA (US); Stephen J. Ippolito, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/799,135

(22) Filed: Mar. 11, 2004

(65) Prior Publication Data

US 2004/0172491 A1 Sep. 2, 2004

Related U.S. Application Data

(63) Continuation of application No. 10/028,065, filed on Dec. 21, 2001, now Pat. No. 6,779,053.

(51) Int. Cl.
*G06F 13/00* (2006.01)
(52) U.S. Cl. ............... 710/33; 711/118; 711/137; 711/213; 711/218

(58) Field of Classification Search ............... 711/137, 711/118, 213, 218; 710/33
See application file for complete search history.

(56) References Cited

U.S. PATENT DOCUMENTS

| | | |
|---|---|---|
| 5,146,578 A | 9/1992 | Zangenehpour |
| 5,483,641 A | 1/1996 | Jones et al. |
| 5,600,817 A | 2/1997 | Macon et al. |
| 5,613,155 A | 3/1997 | Baldiga et al. |
| 5,644,786 A | 7/1997 | Gallagher et al. |
| 5,659,713 A | 8/1997 | Goodwin et al. |
| 6,253,289 B1 | 6/2001 | Bates et al. |
| 6,427,184 B1 | 7/2002 | Kaneko et al. |
| 6,567,894 B1 | 5/2003 | Hsu et al. |

*Primary Examiner*—Pierre Bataille
*Assistant Examiner*—Hetul Patel
(74) *Attorney, Agent, or Firm*—Fish & Richardson P.C.

(57) ABSTRACT

A method of detecting sequential data transfer requests, includes determining whether a first data transfer request crosses a boundary address, and, if it does, determining if the first data transfer request may be indicated as combinable with subsequent data transfer requests. The method may also include determining whether a previous data transfer request has been indicated as combinable, and if it has been indicated as combinable, determining that a new data transfer request is addressed adjacent to the previous data transfer request.

29 Claims, 5 Drawing Sheets

SEQUENTIAL DATA TRANSFER DETECTION USING ADDRESSES OF DATA TRANSFER REQUESTS TO CONTROL THE EFFICIENCY OF PROCESSING THE DATA TRANSFER REQUESTS

This application is a continuation of U.S. application Ser. No. 10/028,065, filed Dec. 21, 2001 now U.S. Pat. No. 6,779,053.

BACKGROUND

This invention relates to detecting sequential data transfers.

Computer processing systems are typically connected to one or more input/output ("I/O") devices. Typically, a processor sends and receives data items to and from I/O devices in a series of data transfers. A sequential data stream refers to two or more data transfer requests that are addressed to adjacent locations on an I/O device, generally in ascending order. The efficiency of processing data transfers affects the overall performance of the processing system.

DESCRIPTION

Figure 1:
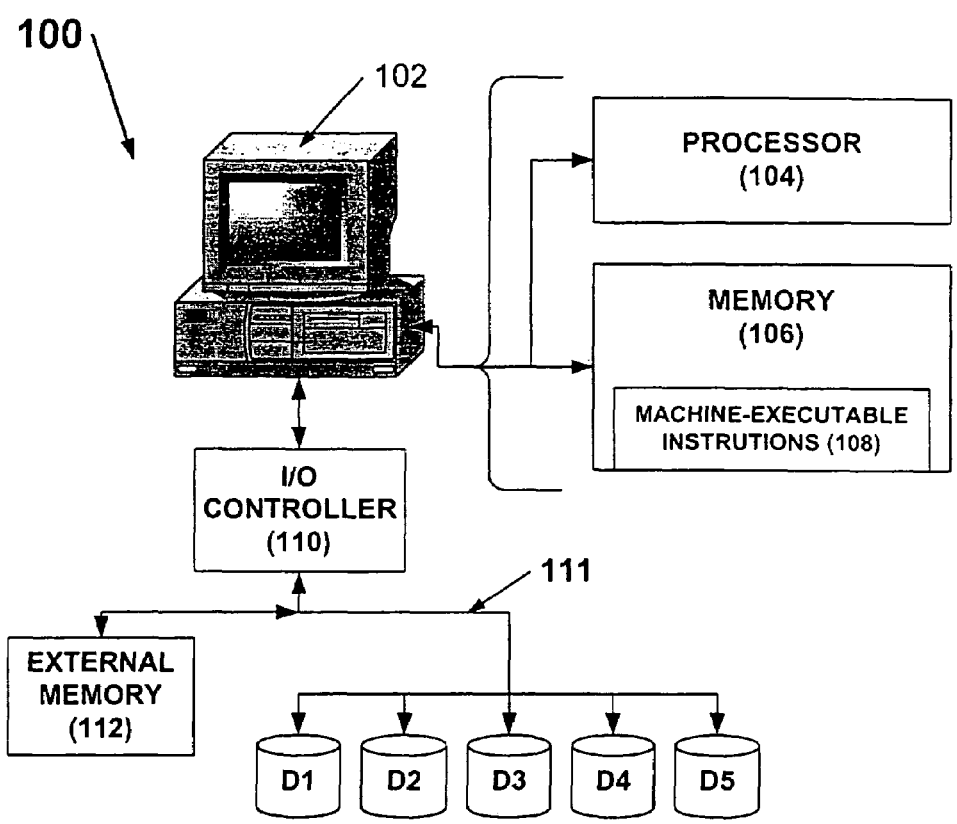
FIG. 1 is a block diagram of a first embodiment of computer hardware on which a sequential stream detection process may be performed.

Referring to FIG. 1, an exemplary computer processing system 100 includes a personal computer 102 having a processor 104 and a memory 106 for storing machine-executable instructions 108. System 100 also includes an I/O controller 110 that is connected to I/O devices, such as an external memory 112 and disks D1-D5, through an I/O bus 111.

Data transfer requests (hereafter referred to as "REQs") are typically generated by computer 102 while executing a program, for example. If the data being read or written is addressed to an I/O device, the REQs are sent to I/O controller 110 (or an I/O sub-process that is performed by processor 104). The REQs are processed as I/O transfers to the appropriate I/O device by I/O processor 110. Each I/O transfer may include processing a single data transfer request, or, in certain cases an I/O transfer may include processing multiple REQs together, as will be explained.

Each I/O transfer performed by I/O processor 110 may require several operations. For example, such operations include arbitrating for I/O bus 111 and sending a command or address on I/O bus 111. Additionally operations can include transmitting addresses on I/O bus 111 to an I/O device, calculation of parity based on the data being transmitted, transmitting the parity information, and receiving acknowledgement that the data sent to or received by an I/O device.

While transmission of the data represents a significant portion of the time required to complete an I/O transfer, much of the time involved in an I/O transfer is consumed by overhead involved by setting up the transaction. If a sequential data stream is detected, the individual REQs may be processed as a combined I/O transfer. Therefore, the time required to process all of the individual REQs is reduced, and the amount of processor execution cycles devoted to completing multiple I/O transfers is also reduced.

Figure 2A:
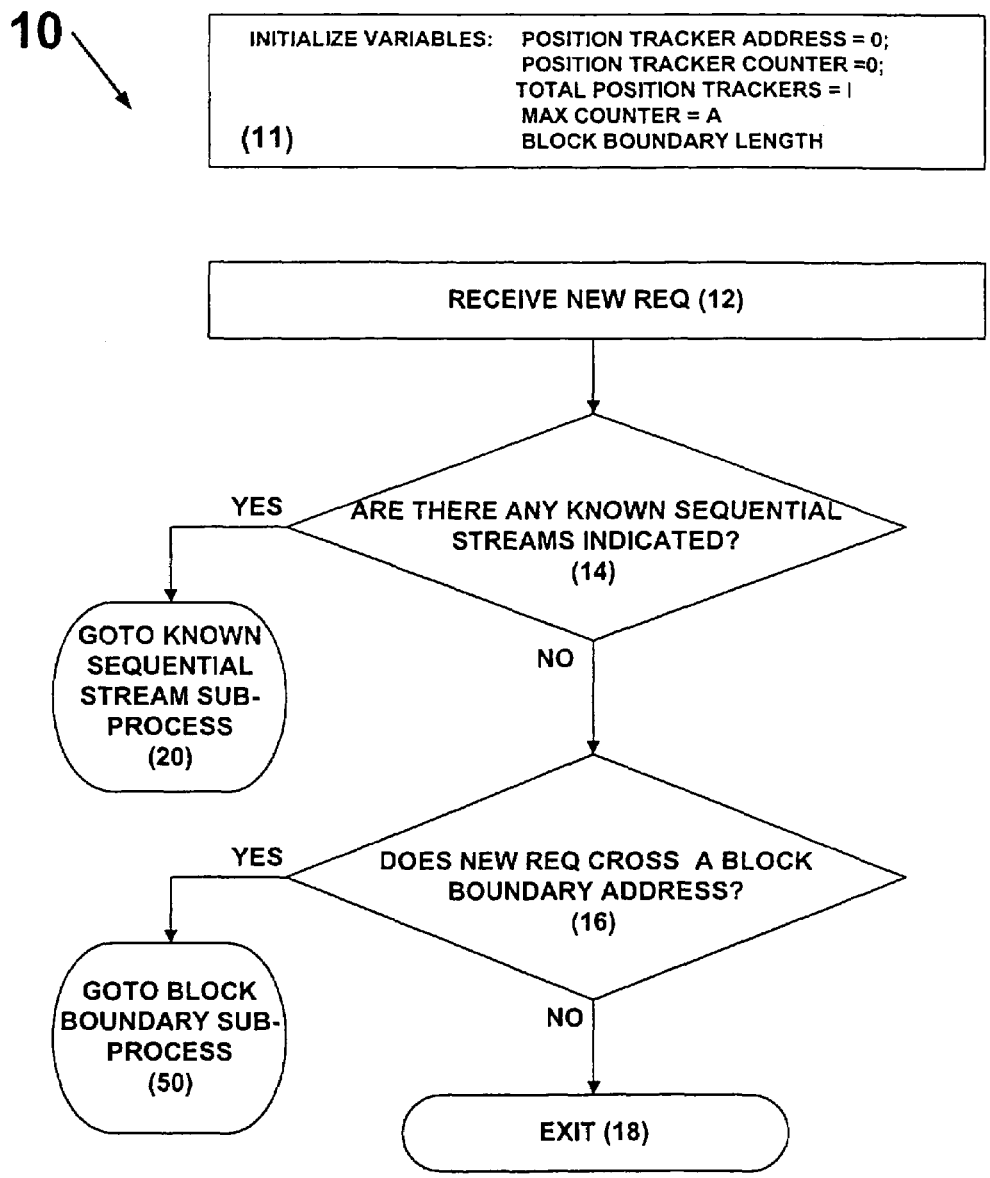
FIGS. 2A-2C are flowcharts showing a process for detecting a sequential data stream.
Figure 2B:
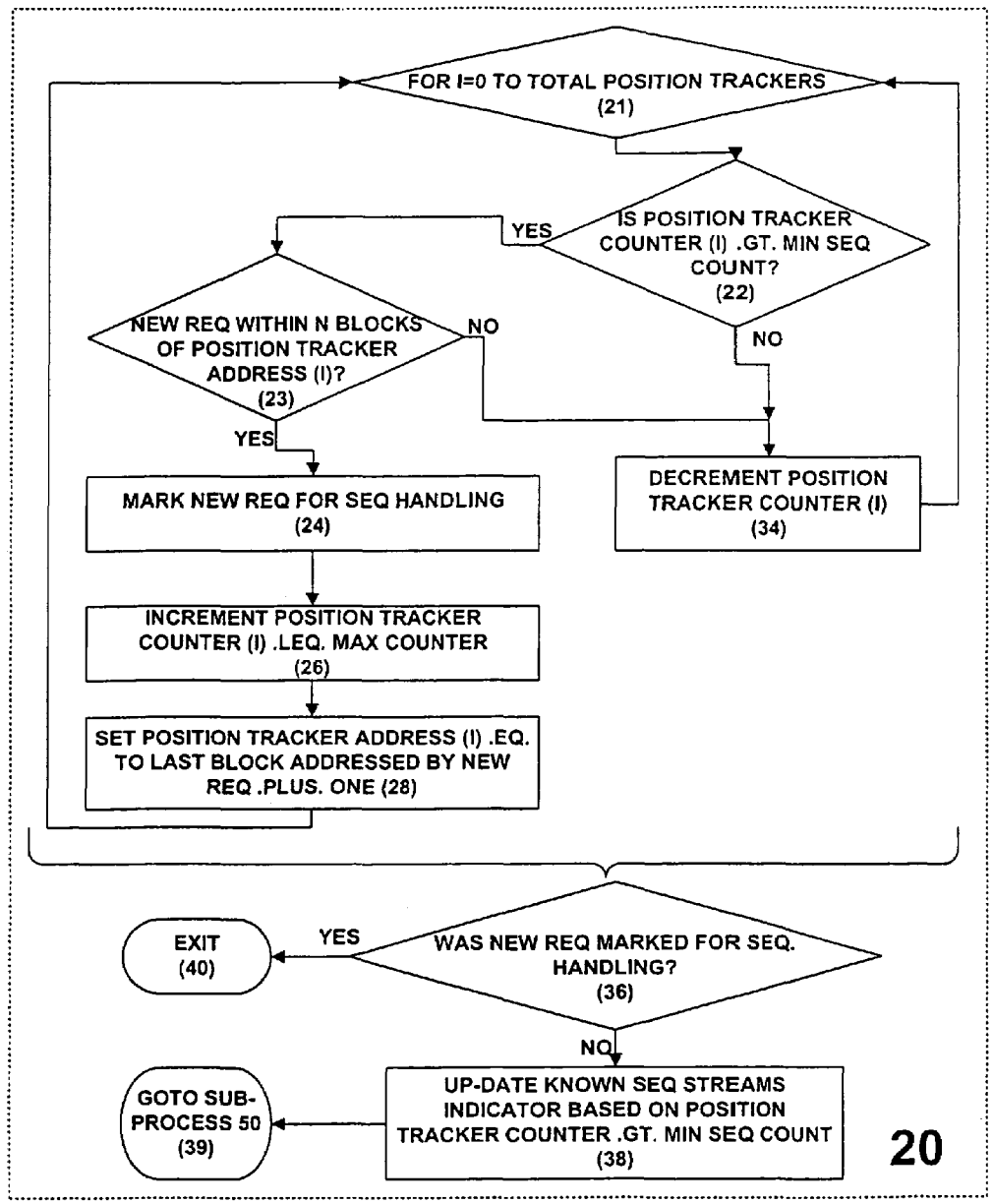
Figure 2C:
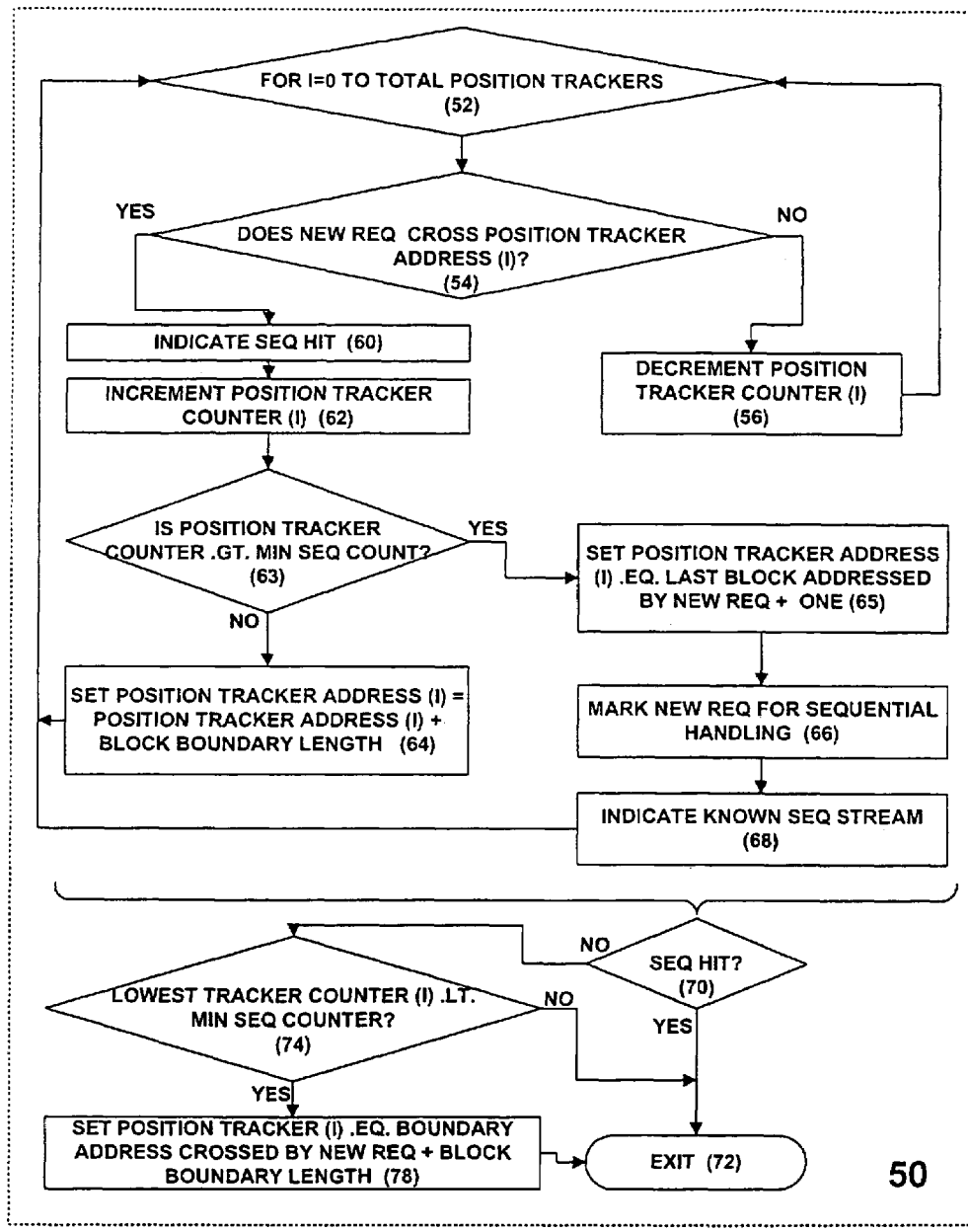

Referring to FIGS. 2A-2C, a process 10 is shown for detecting sequential data transfer requests (reads and writes to adjacent addresses) that may be combined into an input/output (I/O) transfer to an I/O device.

An exemplary sequential data stream "S1" is shown below. This example of a sequential stream includes three separate READ commands: a first REQ Read 10,5) that specifies a beginning address 10 and a block length of 5, and a second REQ (Read 2) that specifies a beginning address 15 and a block length of 20, and a third REQ (Read 3) that specifies address 35 and a block length of 10.

| S1: | READ (10,5); Block 10-14 |
|---|---|
| | READ (15,20); Block 15-34 |
| | READ (35,10); Block 35-44 |

Sequential stream S1 can be processed as a combined I/O transfer, that is, an I/O READ that begins at address 10 with a block size of 35, as shown below.

| I/O READ (10,35); | Combined I/O transfer, reading address 10-44. |
|---|---|

Process 10 analyzes new REQs only if process 10 determines (14) that there is at least one "Known Sequential Stream" (i.e., a previous sequential data stream has been detected and indicated as a known sequential stream), or if process 10 determines (16) that a new REQ crosses a predefined "block boundary address". Process 10 includes a sub-process 50 that, when performed, may detect and indicate a "known sequential stream". Sub-process 50 is performed when process 10 determines (16) that an address of a block included in the address range of a new REQ includes the block boundary address, as will be explained.

Process 10 includes initializing (11) variables that are used during process 10. Process 10 initializes (11) a global array structure that includes at least one position tracker address and a corresponding position tracker counter. The total number of position trackers and corresponding tracker counters being used during process 10 may be more than one, therefore process 10 initializes (11) a Total Position Trackers variable equal "I" (I being the number of position tracker addresses being used during process 10). Process 10 also initializes (11) a Block Boundary Length, and a programmable variable (set by a programmer or user of process 10), "Max Counter". Max counter defines an upper limit for each tracker counter value that may be achieved for a detected sequential stream. Defining Max Counter is necessary since each tracker counter is incremented for each detected sequential "hit", and then decremented for each sequential "miss", as will be explained. A detected sequential stream continues to be tracked until the corresponding tracker counter value has been decremented to a relatively low number. Therefore, setting Max Counter equal to 100 sequential hits, for example, defines an upper limit for each tracker counter value and reduces the amount of time required to decrement a tracker counter for a sequential stream that is no longer having sequential hits.

Still referring to FIG. 2A, process 10 receives (12) a new REQ, determines (14) if there are any Known Sequential Streams indicated, and if there are any known sequential streams indicated, jumps (20) to sequential stream sub-process 20 (see FIG. 1A). If there are not any known sequential streams indicated, process 10 determines (16) if the new REQ crosses a block boundary address. If the new REQ does cross a block boundary address, process 10 jumps (50) to a block boundary sub-process 50 (see FIG. 1B). If the new REQ does not cross a block boundary address, process 10 exits (18), and the new REQ is processed normally, that is, the new REQ is not marked for sequential handling.

Known Sequential Stream indicator gets set (and cleared) during performance of sub-process 50. Therefore, sub-process 20 is only performed after sub-process 50 has been performed at least once, and has set the Known Sequential Stream indicator. Sub-process 50 will, therefore, be described before describing sub-process 20.

Sub-process 50 (see FIG. 2C) includes a loop (52) that is repeated I times, for each position tracker (I). Each time through loop (52) sub-process 50 determines (54) if a new REQ includes a block that "crosses" a position tracker address (I). In more detail, each position tracker address (I) is initially set to an even multiple of the block boundary length. Determination (54) includes determining if a block within the address range of the new REQ also includes the block boundary address of position tracker (I). For example, a READ (80,22) includes an address range of blocks 80 through 101, and therefore crosses a position tracker address (I) of 100. If sub-process 50 determines (54) that that new REQ crosses position tracker (I) address, sub-process 50 indicates (60) a sequential hit and increments (62) position tracker counter (I). Sub-process 50 then determines (63) if position tracker counter (I) is greater than Min Seq Count. Min Seq Count is a programmable variable that is used to define a minimum number of sequential hits that must be detected before indicating (68) a Known Sequential Stream. If sub-process 50 determines (63) that position tracker counter (I) is greater than Min Seq Count, the loop (52) sets (65) position tracker address (I) equal to the last block addressed by the new REQ plus one (to point to the next adjacent address of a sequential data stream) and marks (66) the new REQ for sequential handling, indicates (68) a Known Sequential Stream is being tracked, and returns to the beginning of loop (52). If sub-process 50 determines that position tracker counter (I) is not greater than Min Seq Count, sub-process 50 sets (64) position tracker (I) address equal to the next boundary address (position tracker address (I) added to Block Boundary Length), and returns to repeat loop (52). If sub-process 50, in loop (52), determines (54) that new REQ address does not cross position tracker (I) address, process 50 decrements (56) position tracker counter (I) and returns to the beginning of loop (52).

When loop (52) has completed, sub-process 50 determines (70) if a Seq Hit was indicated (by action (60)) during loop (52). If a Seq Hit was indicated, sub-process 50 exits (72). If sub-process 50 determines (70) that there was not a Seq Hit indicated, sub-process 50 determines (74) the lowest position tracker counter (I) value that is less than Min Seq Count, and sets (78) the corresponding position tracker address (I) equal to the boundary address crossed by the new REQ plus the boundary address length. Sub-process 50 exits (72).

Sub-process 20 (see FIG. 2B) includes a loop (21) that is repeated I times, for each position tracker (I). Sub-process 20 uses a programmable variable "N" to determine (23) the maximum gap between a new REQ address and a position tracker address that may still be marked as part of a sequential stream. In more detail, variable N allows a slightly "out-of-order" new REQ address to become part of a sequential stream. For example, a variable N equal to ten would allow an out-of-order address of 70 to be marked for sequential handling when compared to a position tracker address that is currently equal to 60.

Each time through loop (21) sub-process 20 determines (21) if position tracker (I) is greater than Min Seq Count, if it does determine position tracker (I) is greater than Min Seq count, sub-process 20 determines (23) if the new REQ address is within N blocks of position tracker address (I), if it is, process 10 marks (24) the new REQ for sequential handling (i.e., as part of a sequential stream). Sub-process 20 increments (26) position tracker counter (I) as long as position tracker counter is less than or equal to Max Counter. Sub-process 20 sets (28) position tracker address (I) equal to the last block addressed by the new REQ plus one, i.e., setting position tracking address (I) to point to the next sequential address in the sequential stream being tracked by position tracker address (I). Sub-process 20 returns to the beginning of loop (21), and repeats determination (22). If sub-process 20 determines that position tracker counter (I) is not greater than Min Seq Count, or if sub-process 20 determines (23) that new REQ address is not within N blocks of position tracker address (I), sub-process 20 decrements (34) position tracker counter (I) and returns to the beginning of loop (21).

Following completion of loop (21), sub-process 20 determines (36) if new REQ was marked for sequential handling (action 24), and if new REQ was marked for sequential handling process 20 exits (40). If new REQ was not marked for sequential handling, process 20 up-dates (38) the indicator for known sequential streams, that is, determining if any of the position tracker counter (I) values are greater than a specified minimum number, e.g., greater than a Min Seq Count variable. After up-dating (38) Known Sequential Streams indicator, sub-process 20 jumps (39) to sub-process 50.

It is often the case that the majority of REQs being generated by a computer processor are random REQs (REQs addressed to non-sequential addresses). In such a case, performing process 10 to detect a sequential stream effectively reduces the number of processing cycles spent analyzing new REQs, because process 10 only analyzes new REQs if it determines (14) that there is already a Known Sequential Stream indicated, or if process 10 determines (16) that a new REQ crosses a block boundary address. Otherwise, process 10 exits (18), therefore most new REQs are processed as individual I/O transfers without performing any sequential stream detection.

In an embodiment of process 10, a relatively large Block Boundary Length is defined to reduce the number of new REQs that are analyzed by process 10, and therefore reducing the amount of processor execution time devoted to analyzing new REQs. In more detail, by defining a Block Boundary Length that is relatively large, random REQs are unlikely to cross a boundary block address since there are many more non-boundary addresses than boundary block addresses.

In a further embodiment of process 10 includes defining a block boundary length that is a power of two, so that the block boundary crossing determination (16) (or determination (50)) may be completed by performing logical bit comparisons on the most significant bit, or bits, of the boundary address and the new REQ address. In more detail, consider the following example in which block boundary lengths and boundary address sizes are expressed as hexadecimal numbers: Using a block boundary length of 100, and an initial block boundary address of 100, a new REQ is received, "READ (FF,2)". READ (FF,2) covers an address range from 0FF to 101, that is, having a beginning block of 0FF, and an ending address of block 101. Process 10 compares (using, e.g., an "AND" function) the most significant bit (MSB) of beginning address 0FF to the MSB of boundary address 100. In this case, the first comparison result is "not equal". Next, process 10 compares the MSB of ending address 101 to the MSB of boundary address 100. In this case, the second comparison result is "equal". Since the first comparison result is equal and the second comparison result is not equal, it is guaranteed that address 100 is contained within the READ (FF,2), and that this new REQ crosses boundary address 100.

A conventional technique of testing for a boundary address crossing requires performing at least one division operation. However, each execution of a division operation requires multiple processor cycles to complete. For example, using a division operation to determine a boundary address crossing of the previously described REQ, "READ (FF,2)", would proceed as follows: READ beginning address of 0FF is divided by boundary address 100 (0FF/100) and the first division result is zero. Next, READ ending address of 101 is divided by the boundary address of 100 (101/100) and the second division result is one. Since the first division result (zero) does not equal the second division result (one), the boundary address was crossed by this new REQ. However, this technique of testing for a boundary crossing requires performing at least two division operations.

By comparison, as previously described, process 10 determines a boundary address crossing by performing logical bit comparisons (e.g., an "AND" function, or an "EQUAL"/"NOT EQUAL" function) which are simpler and faster to perform than the traditional method of performing division functions.

It may be the case that random REQs are being generated and inter-mixed with sequential REQs. This may be the case if a computer processor switches from the execution of a first program to a second program. Also, there may be multiple sequential streams that are being generated in an inter-mixed fashion. In an embodiment, process 10 uses multiple position trackers and associated position tracker counters to detect multiple sequential data streams.

Figure 3:
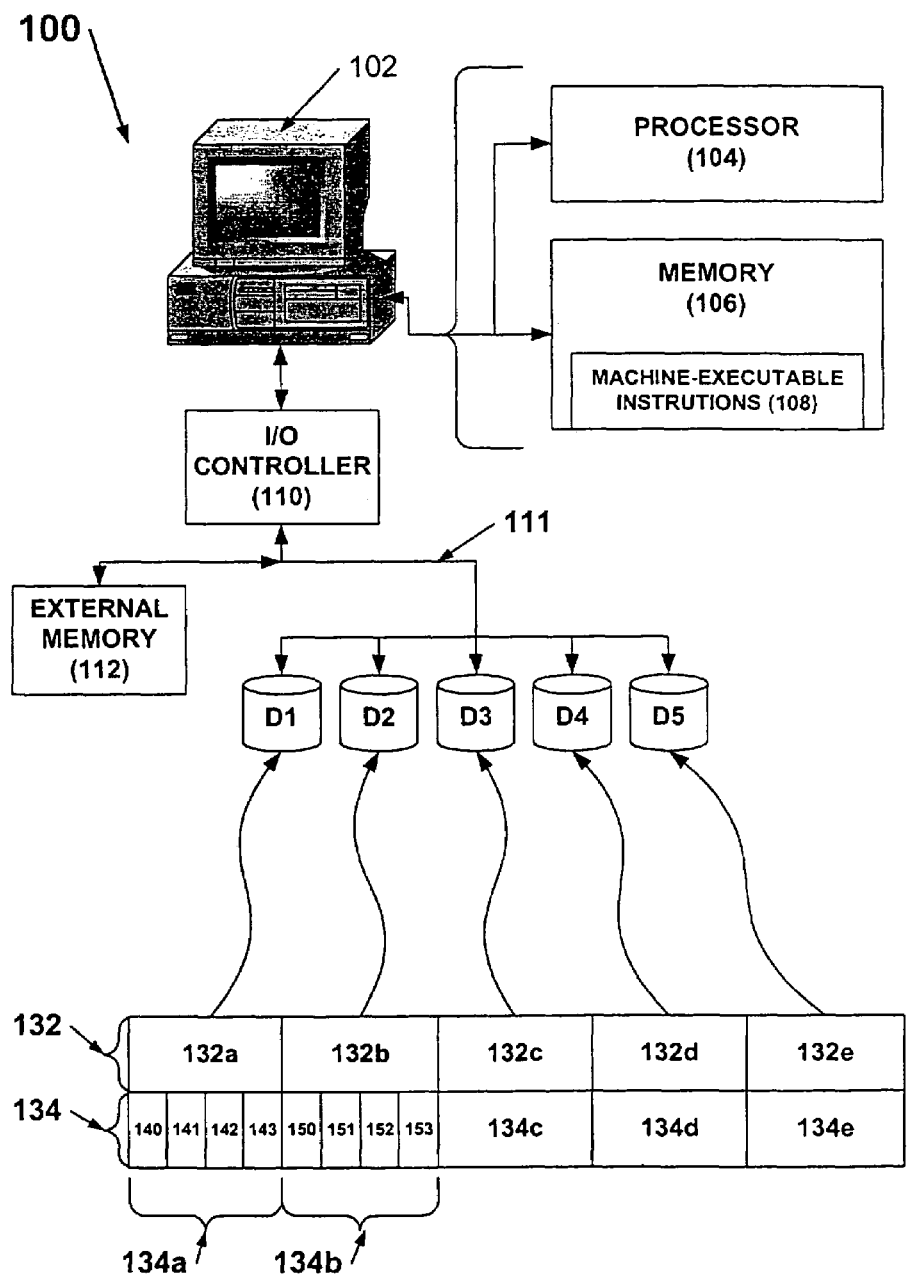
FIG. 3 is a block diagram of a second embodiment of computer hardware on which a sequential data stream detection process may be performed.

Referring to FIG. 3, REQs generated by computer 102 may be addressed to a "logical" address that is then mapped by I/O controller 110 to a physical address, or address range, on one or more of the input/output devices, D1-D5. Mapping logical address space to physical addresses and physical devices is sometimes implemented using a "RAID" mapping process. "RAID" refers to a "Redundant Array of Inexpensive Disks", that is, mapping a logical address space to multiple physical devices according to a specific RAID process. Several different RAID mapping processes are available.

FIG. 3 shows an exemplary RAID mapping process that partitions a "stripe" of data, 132 or 134, into several "strips" of data, 132a-132e and 134a-134e, respectively. In this example, each strip of data, 132a-132e and 134a-134, is mapped to a different physical device, disks D1-D5, respectively. Furthermore, each strip may contain multiple adjacent sub-blocks of data, for example, strip 134a includes sub-blocks 140-143, and strip 134b includes sub-blocks 150-153. Therefore, if system 100 is using a RAID mapping process, individual data transfers to adjacent sub-blocks within a strip may be processed as a combined I/O transfer. Furthermore, data transfers to adjacent sub-blocks that "cross over" a strip boundary but are within a single stripe may be processed as a combined I/O transfer (as an example, sub-block 143 is adjacent to sub-block 150 within the same stripe 134). As a result, the performance of the I/O controller 110 and system 100 is improved because fewer I/O transfers need to be performed by I/O controller 110.

Process 10 includes, in some cases, a determination whether a combined I/O transfer is "Optimum-sized". "Optimumsize" refers to a maximum size of a combined I/O transfer based on the address mapping scheme being used by I/O controller 110. For example, in some RAID mapping schemes, an "optimum-size" combined I/O read would allow for the combining of data transfers that address only sub-blocks within a single strip of data. This occurs because a combined read I/O transfer that crosses a strip boundary would require separate I/O transfers for each strip, therefore, combining read data transfers that cross strip boundaries would not necessarily improve system performance. As another example, in some RAID mapping processes, an "optimum-sized" combined write I/O transfer would combine data transfers that address adjacent sub-blocks within an entire stripe of data. This is due to the fact that certain RAID mapping processes include an Error Correcting Code (ECC) calculation based on the data contained in all of the strips of data within a stripe. Therefore, the ECC calculation is made faster by combining any adjacent data transfers that cross strip boundaries within a stripe, and avoiding having to read those strips being combined when performing ECC calculations.

Process 10 is not limited to use with the hardware and software of FIGS. 1 and 4. It may find applicability in any computing or processing environment. Process 10 may be implemented in hardware, software, or a combination of the two. Process 10 may be implemented in computer programs executing on programmable computers or other machines that each include a processor, a storage medium readable by the processor (including volatile and non-volatile memory and/or storage components), at least one input device, and one or more output devices. Each such program may be implemented in a high level procedural or object-oriented programming language to communicate with a computer system. However, the programs can be implemented in assembly or machine language. The language may be a compiled or an interpreted language.

I/O controller 110 may be included as a part of computer 102, that is, as part of the same integrated processor or as part of the same computer chassis, and may share the processor 104 and memory 106. Machine-executable instructions may also be executed from a ROM or they can be moved from ROM to memory 106. Process 10 may be performed by computer 102 before a REQ is sent to I/O controller 110.

The invention is not limited to the specific embodiments described above. For example, logical to physical address mapping to multiple physical devices was mentioned. However, a single physical device, such as a magnetic tape drive, could be logically to physically mapped, that is, mapping different physical locations on the tape media to logical address space. Furthermore, process 10 may also be used even when no address mapping scheme is being used. We also mentioned "read" and "write" commands as example of data transfer requests. However, "reads" and "write" commands could be more complex commands such as a "write with verify", etc. We mentioned one definition of "sequential" as including stripes of data immediately before or after another stripe of data referenced by a REQ. However, this definition of "sequential" could be expanded to include a larger range of data sizes and configurations. We also mentioned, as an example, a boundary block size of 100. However, much larger (or smaller) block sizes could be used. Also, a single position tracker address and an associated position tracker counter be used during the performance of process 10.

Other embodiments not described herein are also within the scope of the following claims.

What is claimed is:

1. A method of processing data transfer requests, the method comprising:
   determining whether a first data transfer request crosses a boundary address associated with an address space, and, if it does not, transferring data identified by the first data transfer request to or from an input/output device, and, if it does:
   determining if the first data transfer request is indicated as being combinable with subsequent data transfer requests, and
   transferring data identified by the first data transfer request to or from an input/output device according to results of determining if the first data transfer request is indicated as being combinable with subsequent data transfer requests.

2. The method of claim 1, further comprising:
   determining whether a previous data transfer request has been indicated as combinable, and if it has been indicated as combinable:
   determining that a new data transfer request is addressed adjacent to the previous data transfer request.

3. The method of claim 2, wherein determining that the new data transfer request is addressed adjacent comprises:
   determining that the new data transfer request is addressed within a specified minimum number of blocks as the previous data transfer request.

4. The method of claim 2, wherein a specified minimum number of boundary address crossings are determined before indicating data transfer requests may be combinable.

5. The method of claim 2, further comprising:
   defining a boundary block length that is at least two blocks; and
   determining the first data transfer request crosses an address equal to a multiple of the boundary block length before indicating the first data transfer request may be combinable.

6. The method of claim 5, further comprising:
   setting a first tracking address equal to a multiple of the boundary block length;
   determining a second data transfer request crosses the first tracking address; and
   indicating the second data transfer request may be combinable with subsequent data transfer requests.

7. The method of claim 6, further comprising:
   tracking at least two separate sequential streams for sequential handling.

8. The method of claim 7, wherein tracking further comprises:
   storing a tracking address and a corresponding tracking address counter value for each tracked sequential stream.

9. The method of claim 8, further comprising:
   incrementing one of the tracking address counters for each data transfer request determined adjacent to a previous data transfer request; and
   indicating that one of the tracked sequential streams may be released as a combined I/O transfer when a corresponding one of the tracking address counters is greater than a specified maximum value.

10. The method of claim 9, further comprising:
    decrementing one of the tracking address counters for each data transfer request determined not adjacent to a previous data transfer request.

11. The method of claim 5, wherein the boundary block length is a power of two, and wherein determining whether the first data transfer request crosses a boundary address comprises:
    determining whether a most significant bit of the boundary block length is equal to a most significant bit of the first data transfer request address.

12. An article comprising a machine-readable medium that stores machine-executable instructions for detecting sequential data transfer requests, the instructions causing, a machine to:
    determine whether a first data transfer request crosses a boundary address associated with an address space, and, if it does not, transfer data identified by the first data transfer request to or from an input/output device, and, if it does:
    determine if the first data transfer request is indicated as being combinable with subsequent data transfer requests, and
    transfer data identified by the first data transfer request to or from an input/output device according to results of determining if the first data transfer request is indicated as being combinable with subsequent data transfer requests.

13. The article of claim 12, further comprising instructions causing a machine to:
    determine whether a previous dating transfer request has been indicated as combinable, and if it has been indicated as combinable:
    determine that a new data transfer request is addressed adjacent to the previous data transfer request.

14. The article of claim 13, wherein determining that the new data transfer request is addressed adjacent comprises determining that the new data transfer request is addressed within a specified minimum number of blocks as the previous data transfer request.

15. The article of claim 13, wherein a specified minimum number of boundary address crossings are determined before indicating data transfer requests may be combinable.

16. The article of claim 13, further comprising instructions causing a machine to:
    define a boundary block length that is at least two blocks; and
    determine the first data transfer request crosses an address equal to a multiple of the boundary block length before indicating the first data transfer request may be combinable.

17. The article of claim 16, further comprising instructions causing a machine to:
    set a first tracking address equal to a multiple of the boundary block length;
    determine a second data transfer request crosses the first tracking address; and
    indicate the second data transfer request may be combinable with subsequent data transfer requests.

18. The article of claim 16, wherein the boundary block length is a power of two, and wherein determining whether the first data transfer request crosses a boundary address comprises determining whether a most significant bit of the boundary block length is equal to a most significant bit of the first data transfer request address.

19. The article of claim 16, wherein at least two separate sequential streams are tracked for sequential handling, wherein the article further comprises instructions causing a machine to:
store a tracking address and a corresponding tracking address counter value for each tracked sequential stream.

20. The article of claim 19, further comprising instructions causing a machine to:
increment one of the tracking address counters for each data transfer request determined adjacent to a previous data transfer request; and
indicate that one of the tracked sequential streams may be released as a combined I/O transfer when a corresponding one of the tracking address counters is greater than a specified maximum value.

21. The article of claim 20, further comprising instructions causing a machine to:
decrement one of the tracking address counters for each data transfer request determined not adjacent to a previous data transfer request.

22. Apparatus comprising:
an input/output device;
a computer processing device configured to detect sequential data transfer requests;
determine whether a first data transfer request crosses a boundary address associated with an address space of the input/output device, and, if it does not, transfer data identified by the first data transfer request to or from the input/output device, and, if it does:
determine if the first data transfer request is indicated as being combinable with subsequent data transfer requests, and
transfer data identified by the first data transfer request to or from the input/output device according to results of determining if the first data transfer request is indicated as being combinable with subsequent data transfer requests.

23. The apparatus of claim 22, wherein the computer processing device is further configured to:
determine whether a previous data transfer request has been indicated as combinable, and if it has been indicated as combinable:
determine that a new data transfer request is addressed adjacent to the previous data transfer request.

24. The apparatus of claim 23, wherein determining that the new data transfer request is addressed adjacent comprises determining that the new data transfer request is addressed within a specified minimum number of blocks as the previous data transfer request.

25. The apparatus of claim 23, wherein a specified minimum number of boundary address crossings are determined before indicating data transfer requests may be combinable.

26. The apparatus of claim 23, wherein the computer processing device is further configured to:
define a boundary block length that is at least two blocks; and
determine the first data transfer request crosses an address equal to a multiple of the boundary block length before indicating the first data transfer request may be combinable.

27. The apparatus of claim 26, wherein the computer processing device is further configured to:
set a first tracking address equal to a multiple of the boundary block length;
determine a second data transfer request crosses the first tracking address; and
indicate the second data transfer request may be combinable with subsequent data transfer requests.

28. The apparatus of claim 26, wherein the boundary block length is a power of two, and wherein determining whether the first data transfer request crosses a boundary address comprises determining whether a most significant bit of the boundary block length is equal to a most significant bit of the first data transfer request address.

29. The apparatus of claim 26, further configured to:
track at least two separate sequential streams for sequential handling.

* * * * *